US009686399B2

United States Patent
Blom et al.

(10) Patent No.: US 9,686,399 B2
(45) Date of Patent: Jun. 20, 2017

(54) PROTECTION OF A WIRELESS COMMUNICATIONS DEVICE AGAINST UNAUTHORIZED USE

(75) Inventors: Rolf Blom, Järfälla (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 246 days.

(21) Appl. No.: 14/421,192

(22) PCT Filed: Sep. 7, 2012

(86) PCT No.: PCT/EP2012/067590
§ 371 (c)(1),
(2), (4) Date: Feb. 12, 2015

(87) PCT Pub. No.: WO2014/037053
PCT Pub. Date: Mar. 13, 2014

(65) Prior Publication Data
US 2015/0350411 A1    Dec. 3, 2015

(51) Int. Cl.
*H04W 12/06* (2009.01)
*H04W 12/12* (2009.01)
(Continued)

(52) U.S. Cl.
CPC ...... *H04M 1/72577* (2013.01); *H04B 1/3816* (2013.01); *H04W 12/06* (2013.01); *H04W 12/12* (2013.01)

(58) Field of Classification Search
CPC .... H04W 12/06; H04W 12/12; H04B 1/3816; H04M 1/72577
(Continued)

(56) References Cited

U.S. PATENT DOCUMENTS 6,148,192 A * 11/2000 Ahvenainen .......... H04W 12/06
379/357.01
8,600,056 B2 * 12/2013 Heurtaux .............. H04L 9/3263
380/247
(Continued)

FOREIGN PATENT DOCUMENTS

WO           9635304 A1    11/1996

*Primary Examiner* — Nathan Taylor
(74) *Attorney, Agent, or Firm* — Coats & Bennett, P.L.L.C.

(57) ABSTRACT

A method for protecting a wireless communications device against unauthorized use of functionality provided by the wireless communications device, the method comprising: receiving a binding command to bind the wireless communications device to a subscription identification module operationally coupled to the wireless communications device and associated with a subscription to a communications service; responsive to the received command, storing a module identifier identifying the subscription identification module; and storing a device identifier identifying the wireless communications device; obtaining an unbind code and storing the obtained unbind code; performing a module verification verifying that a subscription identification module identified by a stored module identifier is operationally coupled to the wireless communications device, performing a device verification verifying whether a wireless communications device identified by a stored device identifier is operationally coupled to the subscription identification module; and preventing operation of at least a part of said functionality unless the module verification and the device verification have been performed successfully.

15 Claims, 8 Drawing Sheets

(51) Int. Cl.
  *H04M 1/725* (2006.01)
  *H04B 1/3816* (2015.01)
(58) Field of Classification Search
  USPC .......................................................... 455/411
  See application file for complete search history.

(56) References Cited

U.S. PATENT DOCUMENTS

| | | | | |
|---|---|---|---|---|
| 2005/0020308 | A1* | 1/2005 | Lai | H04W 8/183 |
| | | | | 455/558 |
| 2006/0105809 | A1* | 5/2006 | Luo | G06F 21/31 |
| | | | | 455/558 |
| 2008/0003980 | A1* | 1/2008 | Voss | H04L 63/0853 |
| | | | | 455/411 |
| 2008/0090614 | A1* | 4/2008 | Sicher | H04W 8/205 |
| | | | | 455/558 |
| 2010/0222047 | A1* | 9/2010 | Vanderlinden | H04W 8/245 |
| | | | | 455/418 |
| 2010/0275027 | A1* | 10/2010 | Belrose | G06F 21/305 |
| | | | | 713/176 |
| 2013/0095795 | A1* | 4/2013 | Shi | H04L 61/20 |
| | | | | 455/411 |
| 2014/0087790 | A1* | 3/2014 | Babbage | H04W 8/183 |
| | | | | 455/558 |

* cited by examiner

PROTECTION OF A WIRELESS COMMUNICATIONS DEVICE AGAINST UNAUTHORIZED USE

TECHNICAL FIELD

Disclosed herein are embodiments of a method and corresponding devices for protecting a wireless communications device against unauthorized use.

BACKGROUND

Theft and misuse of mobile phones and other wireless communications devices are of big concern to individuals as well as corporations/organizations. Such devices often contain sensitive information and their illegitimate use can incur loss of sensitive data and large costs to its owner or user. To hinder illegitimate use of phones and other radio based equipment different schemes for phone locking and Over-The-Air (OTA) deactivation have previously been designed.

One known procedure for blocking illegitimate use of a mobile phone that may incur cost for the subscription owner is to ask the operator to block the subscription. This however does not stop the use of the phone itself, e.g. by inserting and using another Subscriber Identity Module (SIM) card.

To reduce the risk of misuse of stolen PCs, laptops and other types of mobile equipment several protection methods have been developed. Most devices support the use of passwords for access protection; other devices augment password protection with encryption of data so that this data when being extracted from storage media is not in clear text. However the device itself can in many cases be considered lost as it can be refitted with new software for subsequent use.

The 3GPP Mobile telephony standard specifications discuss the concept of personalization, see 3GPP TS 22.022. Here the International Mobile Subscriber Identity (IMSI) is read from the SIM card and compared to a normally factory-preset data setting. This mechanism is used for operator locking of mobile telephones, i.e. to ensure that a phone can only be used with a subscription from a given operator, i.e. to establish a unidirectional binding between the phone and the SIM cards of a particular operator. However, this prior art mechanism is susceptible to attacks since the communication between the SIM card and the mobile phone is not protected. Thus data that is exchanged can be intercepted and modified. Examples of such attacks are known as TurboSIM where a processor is placed between the SIM card reader and the actual SIM card. Modern mobile phones may implement a secure channel, as for example specified in ETSI TS 102 484, which gives a secure way of communicating between the SIM and the mobile phone. However, an operator lock as described above provides no security to the user against misuse of the mobile phone, if the mobile phone is stolen.

Some solutions exist that are intended to protect mobile telephones from unauthorized use, e.g. the solution marketed under the name McAfee Wavesecure. This solution requires connection to the network infrastructure and thus operation in a coverage area of a communications network. Furthermore, some mobile phones implement what is called a phone lock which blocks normal operation of the phone until a correct Personal Identification Number (PIN) code or password has been entered successfully. These solutions have problems due to the fact that if the user forgets the PIN he or she cannot use the phone. This may force phone manufacturers to create backdoors or tools that can reset such locks. However, since maintaining knowledge of who is the right owner of a phone or not is cumbersome and expensive such backdoors and tools work irrespective if it is the right owner or not. Likewise, some devices augment password protection with encryption of data so that this data when being extracted from storage media (hard disk, tape, flash memory, USB stick, etc.) is not in clear text. However, in many cases, the device itself has to be considered lost as it can be refitted with new software for subsequent use. Hence such phone locks and similar solutions like screen locks have little if any real security value.

Special security solutions like Intel's Anti-theft technology in mobile devices are available. However such solutions imply that the device to be protected needs to be equipped with double security hardware: In addition to the special Anti-theft hardware, functionality and system support a wireless communications device further needs to be equipped with a SIM card or similar hardware in order to get access to most common mobile networks such as Global System for Mobile communication (GSM), Enhanced Data for GSM Evolution (EDGE), Universal Mobile Telecommunication System (UMTS), Long Time Evolution (LTE) etc.

Further security solutions exist that are suitable in environments where the device distribution can easily be controlled, e.g. the security solution for relay nodes (see 3GPP TS 33.401). However, it is normally not practically possible for network operators or device manufacturers to know which communications device is ultimately to be used with which SIM card, thus limiting the usefulness of known operator- or manufacturer-controlled mechanisms.

In view of the above prior art, it would thus be desirable to provide an efficient, user-friendly and secure protection of wireless communications devices against misuse that does not require additional hardware.

SUMMARY

Based on the above, described herein is a method for protecting a wireless communications device against unauthorized use of functionality provided by the wireless communications device, the method comprising:

receiving a binding command to bind the wireless communications device to a subscription identification module operationally coupled to the wireless communications device and associated with a subscription to a communications service;

responsive to the received binding command, storing a module identifier identifying the subscription identification module; and storing a device identifier identifying the wireless communications device;

obtaining an unbind code and storing the obtained unbind code;

performing a module verification verifying that a subscription identification module identified by a stored module identifier is operationally coupled to the wireless communications device;

performing a device verification verifying whether a wireless communications device identified by a stored device identifier is operationally coupled to the subscription identification module; and preventing operation of at least a part of said functionality unless the module verification and the device verification have been performed successfully.

Hence, embodiments of the method described herein provide a secure, user-initiated and user-controlled binding process for establishing a bidirectional binding between a communications device and a subscription identification module. The bidirectional binding allows use of the communications device only with a specific subscription identification module (or with one of a list of specific subscription identification modules), and it allows use of the subscription identification module only with a specific communications device (or with one of a list of specific communications devices.)

The binding is user-initiated, thus allowing the user or owner of the communications device to trigger the establishment of this binding and to release the binding so that the user can use the communications device with another subscription module and vice versa.

In particular, embodiments of the method described herein allow a user/owner of a mobile phone or other communications device to initiate a protection mechanism which protects the communications device and its associated SIM card or other subscription identification module against misuse. For example, misuse of a stolen phone for making phone calls or for using other communications services associated with the subscription identification module may be prevented by blocking the subscription associated with the subscription identification module. Furthermore, embodiments of the method described herein prevent an unauthorized user from successfully replacing the subscription identification module with a different subscription identification module, even if this is a subscription identification module associated with the same service provider, e.g. the same network operator, as the authentic subscription identification module. Such a replacement of subscription identification modules still renders the communications device useless to the unauthorized user as the communications device would detect that the replacement subscription authentication module is not the subscription authentication module that was previously bound to the communications device and would thus block all useful functionality, such as access to stored user contacts, e-mails, documents, or other data or functions.

Consequently the stolen communications device and subscription identification module no longer represent any value to a thief, and a thief is further prevented from accessing sensitive data and/or sensitive functions of the communications device, including functions and data that are not directly related to the service associated with the subscription identification module. In some embodiments, the communications device is adapted to detect whether a subscription identification module has been invalidated by a service provider, e.g. by receiving suitable error messages from a communications network in response to the communications device connecting to a communications network based on the subscription identification module. Accordingly, if the communications device detects that the subscription identification module has been invalidated, the communications device may disable at least selected functionality.

The binding process described herein renders the communications device useless if the subscription identification module to which it is bound is not present, barred by the operator or locked.

Embodiments of the method described herein further allow the owner of a communications device and subscription identification module to ensure that only a legitimate/authorized communications device is used with a given subscription identification module. This can be of importance for enterprises/organizations as they can control that information is only sent/received/stored in approved legitimate equipment.

Embodiments of the method disclosed herein further facilitate a secure unbinding process preventing unauthorized users from removing the binding between a communications device and the subscription module, while providing an authorized user with a convenient mechanism for removing the binding. The unbind code required for the unbinding process may be any suitable data item, e.g. a sequence of alphanumerical characters, or the like.

It will be appreciated that the terms storing the unbind code and storing the device and/or module identifiers are intended to comprise embodiments where the unbind code or device or module identifiers, respectively, are stored in the identical form as they have been obtained, as well as embodiments, where the obtained data item is processed and subsequently stored in processed form. For example, some or all of the data items mentioned above may be stored in encrypted or otherwise cryptographically protected form. Alternatively or additionally, one or more of the above data items may be hashed, e.g. using a suitable one-way hash function, and the respective computed hash value may be stored instead of, or in addition to, the original value of the data item.

In some embodiments, storing the module identifier comprises receiving the module identifier from the subscription identification module and storing the received module identifier. Likewise, storing the device identifier may comprise receiving the device identifier from the wireless communications device and storing the received device identifier. Hence, during the binding process the communications device and the subscription identification module exchange and store their respective identifiers, preferably such that the stored identifiers cannot be altered by an unauthorized user.

In some embodiments, obtaining the unbind code comprises generating the unbind code by the wireless communications device. Hence, a secure yet convenient mechanism for generating the unbind code and making it available to the user who performs the binding is provided.

In some embodiments, storing the unbind code comprises sending the unbind code to a remote data processing system, e.g. a remote server, for storage. Consequently, the unbind code may be securely stored at a remote server, e.g. associated with user credentials of the user or owner of the communications device. This may e.g. be used as a backup storage of the unbind code in case the user forgets or misplaces the unbind code. Alternatively or additionally, the remote server may operate as a management node supporting the binding process.

Generally in some embodiments, control of the binding process may solely rely on the person operating the communications device and/or on a management node controlled by the subscription owner (typically an enterprise). In alternative embodiments, control of the binding process may be controlled by a management node operated by the network operator or similar service provider offering a "protection support" service" to the user/enterprise. This management node may have functions for sending a command to the communications device causing the communications device to establish the binding between the communications device and the subscription identification module. The management node may also have secure storage for storing the codes required to unbind the communications device and the subscription identification module.

In some embodiments, the method further comprises communicating the unbind code by the wireless communications device to the subscription identification module. Consequently, the unbind code may be stored both by the communications device and the subscription identification module, thus allowing use of the same unbind code when the user wishes to use the communications device with a different subscription identification module and when the user wishes to use the subscription identification module with a different communications device. In alternative embodiments, different unbind codes may be generated for unbinding the communications device and for unbinding the subscription identification module, respectively.

The module identifier may be any suitable data item identifying the subscription identification module. In one embodiment the module identifier is an International Mobile Subscriber Identity (IMSI). The device identifier may be any suitable data item identifying the wireless communications module. In one embodiment the module identifier is an International Mobile Equipment Identifier (IMEI). In some embodiments, the subscription identity module may store a list of device module, thus allowing binding to more than one wireless communications devices.

In some embodiments, the module and device identifiers may be respective digital certificates of the subscription identification module and the wireless communications device, respectively. Alternatively, the binding may be based on other suitable credentials used to establish a secure channel between the communications device and the subscription identification module. Accordingly, in some embodiments, the module identifier is a digital certificate of the subscription identification module, and the device identifier is a digital certificate of the wireless communications device, thus providing a secure communications channel for the exchange of data, such as the unbind code, and an increased security of the binding and unbinding process.

In some embodiments, the method comprises creating a security key by the wireless communications device, sending the created security key to the subscription identification module, and storing the security key by the wireless communications device and by the subscription identification module, thus further increasing the security of the binding process. The security key may be a cryptographic key or another secret data item. In some embodiments, the security key is a data item shared by and only known to the wireless communications device and to the subscription identification module and, optionally, to a predetermined remote data processing system where unbind data is stored system for storage.

In some embodiments, the module verification comprises receiving an identifier identifying the subscription identification module from the subscription identification module, and comparing the received identifier with the stored module identifier, and wherein the device verification comprises receiving an identifier identifying the wireless communications device by the subscription identification module, and comparing the received identifier with the stored device identifier. Hence, an efficient and fast verification process is provided that requires little computational resource.

In some embodiments, the module verification comprises setting up a secure communications channel between the wireless communications device and the subscription identification module, using a module digital certificate of the subscription identification module and a device digital certificate of the wireless communications device; verifying the module digital certificate; and the device verification comprises verifying the device digital certificate. In some embodiments, the module verification comprises sending a challenge data item by the wireless communications device to the subscription identification module, receiving a response data item from the subscription identification module and comparing the received response data item with a data item calculated from the challenge data item and the security key. Hence, particularly secure embodiments of the verification process are provided that may be based on existing functionality, e.g. for handling and verifying digital certificates and/or security keys, that in many cases is already available in communications devices. Consequently, embodiments of the binding process described herein may be implemented with a minimum of additional hardware and/or software.

In some embodiments, the method further comprises:
receiving an unbind command and an unbind code by the wireless communications device and, responsive to the unbind command,
comparing the received unbind code to the stored unbind code
deactivating binding the wireless communications device to the subscription identification module if the received unbind code is equal to the stored unbind code. An efficient, convenient, yet secure unbinding process is provided. The unbind code may be received as an input separate from the unbind command or included in or otherwise associated with the unbind command.

In some embodiments, the method comprises:
receiving the binding command by the wireless communications device;
responsive to the received command, storing the module identifier by the wireless communications device; and storing the device identifier by the subscription identification module;
obtaining the unbind code and storing the obtained unbind code by the wireless communications device and by the subscription identification module;
performing the module verification by the wireless communications device;
performing the device verification by the subscription identification module; and
preventing operation of at least a part of said functionality unless the module verification and the device verification have been performed successfully.

Hence, the entire binding process may be performed locally by the communications device and the subscription module. Some embodiments of the process do not require any communication with external entities, i.e. they can even be performed outside the coverage area of cellular telecommunications networks or other communications networks.

The subscription identification module may be any suitable hardware or software component and or a combination thereof implementing subscription identification functionality associated with a subscription to communications services, and an interface for accessing the subscription identification functionality. For example the subscription identification module may be implemented as a hardware and/or software component integrated/embedded into the wireless communications device, e.g. a so-called embedded Universal Integrated Circuit Card (eUICC), a machine-to-machine communications identity module (MCIM), etc. (e.g. as discussed in 3GPP TS 33.812). Alternatively, the subscription identification module may be implemented as a hardware component that may be comprised in the wireless communications device, e.g. a hardware component that can selectively be inserted and removed from the wireless communications device, or that is otherwise operationally connectable to the wireless communications device. Examples of such hardware components include, but are not limited to, a SIM card or other user Universal Integrated Circuit Card (UICC) or other Integrated Circuit Card (ICC).

The command initiating the binding process may be a user command received via a user interface of the wireless communications device or a command received via a data communications interface of the wireless communications device.

The features of embodiments of the methods described herein may be implemented in software and carried out on a wireless communications device, a subscription identification module, or other data processing system caused by the execution of computer-executable instructions. The instructions may be program code means loaded in a memory, such as a Random Access Memory (RAM), from a storage medium or from another computer via a computer network. Alternatively, the described features may be implemented by hardwired circuitry instead of software or in combination with software.

Disclosed herein are different aspects including the method described above and in the following, corresponding methods, apparatus, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

According to one aspect, disclosed herein is a wireless communications device comprising a processing unit, a memory, an interface for receiving commands, and a module interface for communicating data with a subscription identification module operationally coupled to the wireless communications device and associated with a subscription to a communications service; wherein the memory has stored thereon instructions that, when executed by the processing unit, cause the processing unit:
  to store, responsive to a binding command received by the wireless communications device via said interface, a module identifier on the storage device, the module identifier identifying the subscription identification module;
  to send a device identifier identifying the wireless communications device to the subscription identification module via the module interface and to cause the subscription identification module to store the device identifier;
  to store an unbind code on the memory;
  to send the unbind code to the subscription identification module via the module interface and to cause the subscription identification module to store the unbind code;
  to perform a module verification, the module verification verifying that a subscription identification module identified by a stored module identifier is operationally coupled to the wireless communications device;
  to cause the subscription identification module to perform a device verification, the device verification verifying whether the wireless communications device identified by the stored device identifier is operationally coupled to the subscription identification module; and
  to prevent operation of at least a part of said functionality unless the module verification and the device verification have been performed successfully.

The wireless communications device may be any suitable device for communicating via a wireless communications channel, such as a communication channel using radio-frequency communication, e.g. via a cellular telecommunications system, a wireless local area network, short-range wireless communication slinks such as Bluetooth, etc. or combinations thereof. The term wireless communications device includes but is not limited user equipment (UE), e.g. a mobile phone, a smart phone, a portable computer, e.g. a tablet computer, or another suitable communications device. The interface for receiving a command may be a user-interface or a data communication interface.

According to one aspect, disclosed herein is a subscription identification module associated with a subscription to a communications service, the subscription identification module comprising a processing unit a memory, and a device interface for communicating data with a wireless communications device operationally coupled to the subscription identification module; wherein the memory has stored thereon instructions that, when executed by the processing unit, cause the processing unit
  to receive, via the device interface, a data item identifying the wireless communications device, and to store the data item in the memory;
  to receive an unbind code via the device interface and to store the unbind code in the memory;
  to perform a verification verifying whether a wireless communications device identified by a stored data item is operationally coupled to the subscription identification module; and
  to prevent operation of selected functionality of the subscription identification module unless the verification has been performed successfully.

As explained above, the subscription identification module may be any suitable hardware or software component and or a combination thereof implementing subscription identification functionality associated with a subscription to communications services, and an interface for accessing the subscription identification functionality.

According to one aspect, disclosed herein is a data processing system comprising a processing unit, a memory, and an interface for communicating data with a wireless communications device; wherein the memory has stored thereon instructions that, when executed by the processing unit, cause the data processing system
  to receive, via the interface, a data item indicative of at least an unbind code for authorizing deactivation of a binding between the wireless communications device and a subscription identification module operationally coupled to the wireless communications device;
  to digitally sign the received data item; and
  to send, via the interface, the digitally signed data item to the wireless communications device.

The data processing system may be any suitable computer or it may comprise a plurality of computers, e.g. in a distributed processing environment or by one or more virtual machines implemented by a computer network.

BRIEF DESCRIPTION OF THE DRAWINGS

The above and/or additional objects, features and advantages of embodiments of the methods, systems and devices disclosed herein, will be further elucidated by the following illustrative and non-limiting detailed description of embodiments of the methods, systems and devices disclosed herein, with reference to the appended drawings, wherein.

DETAILED DESCRIPTION

In the following description, reference is made to the accompanying figures, which show by way of illustration how embodiments of the methods, systems and devices disclosed herein may be practiced.

Figure 1:
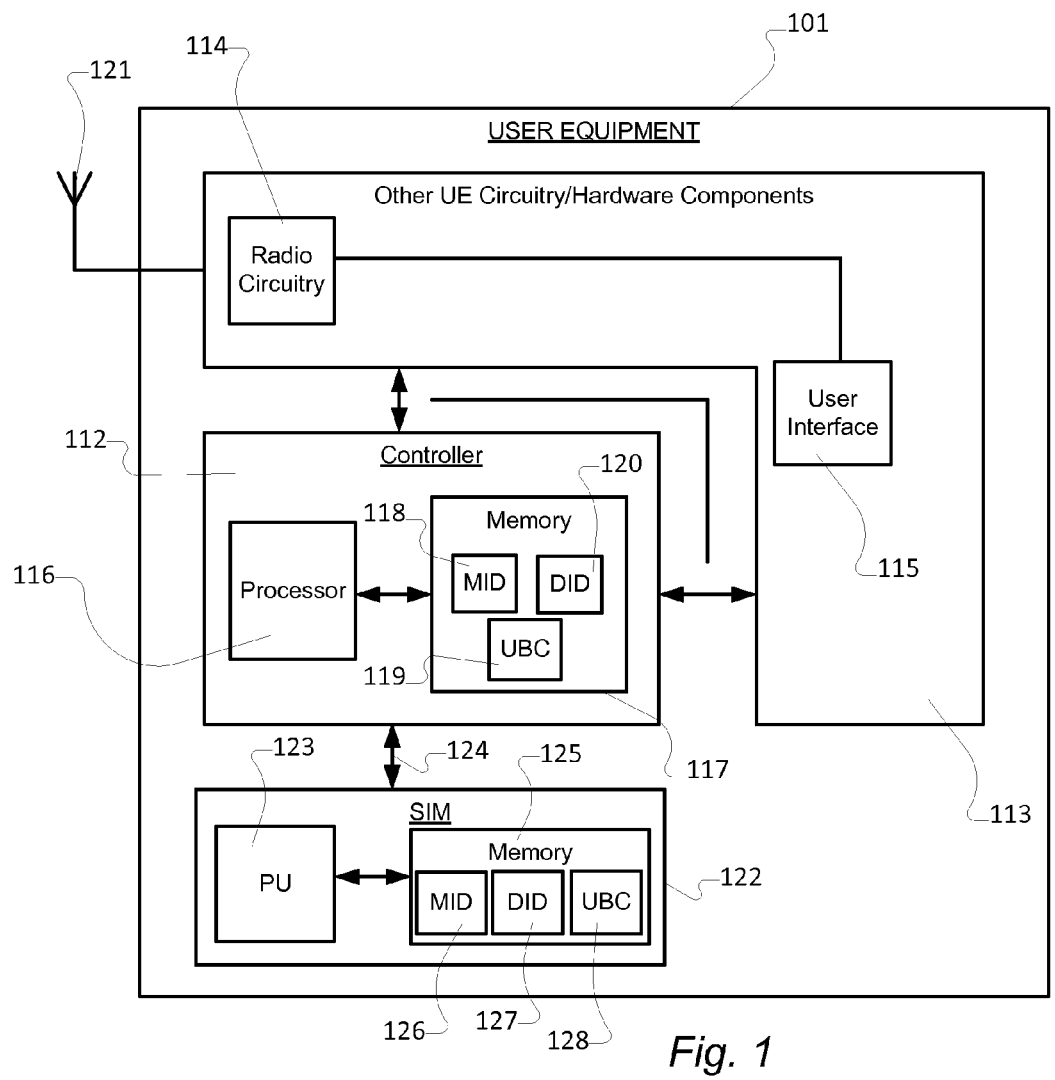
FIG. 1 schematically illustrates parts of an example of a wireless communications device.

FIG. 1 shows a schematic block diagram of an example of a wireless communications device 101, such as a mobile telephone, a smart phone, a portable computer, or the like, or another type of user equipment. The wireless communications device 101 comprises a controller 112 and other circuitry and/or hardware components 113 suitably connected to the controller. The wireless communications device 101 further comprises a subscription identification module 122, such as a SIM card or another removable UICC card that is inserted into the communications device or otherwise operationally coupled to the wireless communications device, e.g. otherwise electrically connected to the wireless communications device. The subscription identification module 122 is connected via a suitable interface 124, such as a wired connection, with the controller 112.

The controller comprises a processing unit 116 and a memory 117 connected to the processing unit. The processing unit 116 may be a microprocessor, CPU, or other suitable processor. The memory 117 may be any suitable volatile or non-volatile memory or other data storage device. The memory may have stored thereon data and computer program code, the program code being adapted to cause the processing unit 116 to perform communications functionality and/or other functionality such as accessing user contacts, documents, e-mails, etc. Accordingly, the data may comprise user data such as documents, e-mail, contacts, and/or other application data. The computer program code may further be adapted to cause the communications device to perform a binding process as described herein. To this end the memory 117 may have stored thereon a module identifier 118 identifying the subscription identification module 122, a device identifier 120 identifying the communications device 101, and an unbind code 119. The other hardware components/circuitry 113 may comprise a user interface 115, e.g. a display, keyboard, keypad, touch screen, and/or the like. The wireless communications device further comprises radio circuitry 114 for radio communication via an antenna 121, e.g. with a cellular telecommunications network. Additionally or alternatively, the wireless communications device may comprise other interface circuitry allowing data communication with other devices, a computer network or the like. The example of FIG. 1 shows a processor-implemented embodiment, but alternative embodiments could use hardwired elements or a combination of both.

The subscription identification module 122 comprises a processing unit 123, e.g. a microprocessor, and a memory 125 or other data storage device. The memory may have stored thereon data and computer program code, the program code being adapted to cause the processing unit 123 to perform subscriber authentication functionality and/or other functionality such as encryption/decryption services, verification of digital certificates, storage of application data, and/or the like. Accordingly, the data may comprise user credentials and/or other subscription-related data and/or application-related data. The computer program code may further be adapted to cause the subscription identification module 122 to perform steps of a binding process as described herein. To this end the memory 125 may have stored thereon a module identifier 126 identifying the subscription identification module 122, a device identifier 127 identifying the communications device 101, and an unbind code 128.

Figure 2:
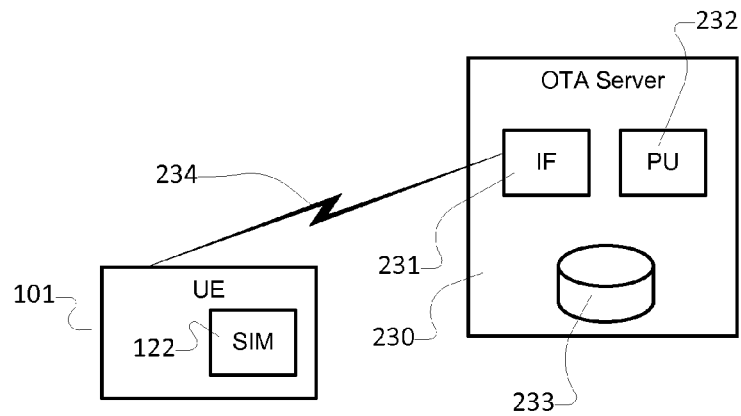
FIG. 2 schematically illustrates an example of a system comprising a wireless communications device and a remote server.

FIG. 2 schematically illustrates an example of a system comprising a wireless communications device and a remote server. The system comprises a wireless communications device 101, e.g. user equipment such as a mobile phone, and a remote data processing system 230, such as a server computer. The wireless communications device 101 comprises or is otherwise operationally connected to a subscription identification module 122 such as a SIM card. The wireless communications device may be of the type described in connection with FIG. 1, or another suitable wireless communications device comprising communications circuitry, a processor, memory, and comprising or being operationally coupled to the subscription identification module 122. The subscription identification module 122 may be of the type described in connection with FIG. 1 or another suitable subscription identification module comprising a processing unit, a memory, and an interface for exchanging data with the wireless communications device. The subscription identification module may be implemented as a hardware component, as a software component or a combination thereof.

The data processing system 230 comprises a processing unit 232, e.g. a central processing unit of a computer, a data storage medium 233, such as hard disk, optical storage or other mass storage device, e.g. implementing a database system. The storage medium has stored thereon unbind codes for use in a method as described herein and, optionally, user credentials or other data associated with the wireless communications device and/or a user and/or owner of the wireless communications device and/or the subscription identification module. The data processing system 230 further comprises a communications interface 231 allowing the data processing interface to communicate data with the wireless communications device via a suitable communications channel 234. The data processing system 230 may be a single computer or comprise two or more computers. In some embodiments the data processing system 230 may be implemented by one or more virtual machines, cloud computing technologies, and/or the like.

The communications channel 234 may comprise a cellular communications network, a computer network such as the internet, a short-range wireless or wired communication link, or any other suitable wired or wireless communication channel, and/or combinations of the above. Consequently, the communications interface 231 may comprise any suitable circuitry or device allowing the data processing device to communicate with the wireless communications device, e.g. a network adapter, a network card, a radio-frequency transmitter, and/or combinations thereof. In some embodiments of the method described herein, the binding or unbinding processes are supported or even controlled by the external data processing system 230 while, in alternative embodiments, the method described herein may be implemented by the wireless communications device 101 and the subscription identification module 122 alone, i.e. without need for an external data processing system 230.

In the following, examples of the binding and unbinding processes disclosed herein will be described in more detail and, in particular, the signaling flow between and the steps performed by the wireless communications device and the subscription identification unit and/optionally a remote data processing system. Embodiments of the processes described below may e.g. be performed by a wireless communications device, a subscription identification module and, optionally a data processing system, as described in connection with FIGS. 1-2 above. For the sake of ease of description, the wireless communications device will be referred to as user equipment (UE), and the description will refer to the subscription identification module as (SIM). It will be appreciated, however, that the described examples may be implemented by other types of wireless communications devices than user equipment and/or by subscription identification modules other than SIM cards, e.g. any by suitable component that holds one or more subscription identification applications.

It will further be appreciated that the signaling flows described below are just examples and the order in which the steps are performed may be changed, and steps may be deleted or combined within the described procedure or with other standard procedures in order to optimize the flows or adapting the signaling flow to different specific applications. It is worthwhile noting that the unbind codes mentioned below do not need to be generated as described but could e.g. be entered by the user. Different codes may be used to unlock the wireless communications device and the subscription identification module, respectively. Furthermore, it should be noted that the wireless communications device and/or the subscription identification module may store a hash value of the unbind code. In such an embodiment, when the code is entered, it is hashed and the result is compared to the stored hash value. Similarly, the wireless communications device and/or the subscription identification module may store respective hash values of the module identifier and/or the device identifier. Alternatively or additionally, any or all of the above data items may be stored in processed form, e.g. in encrypted form.

Figure 3:
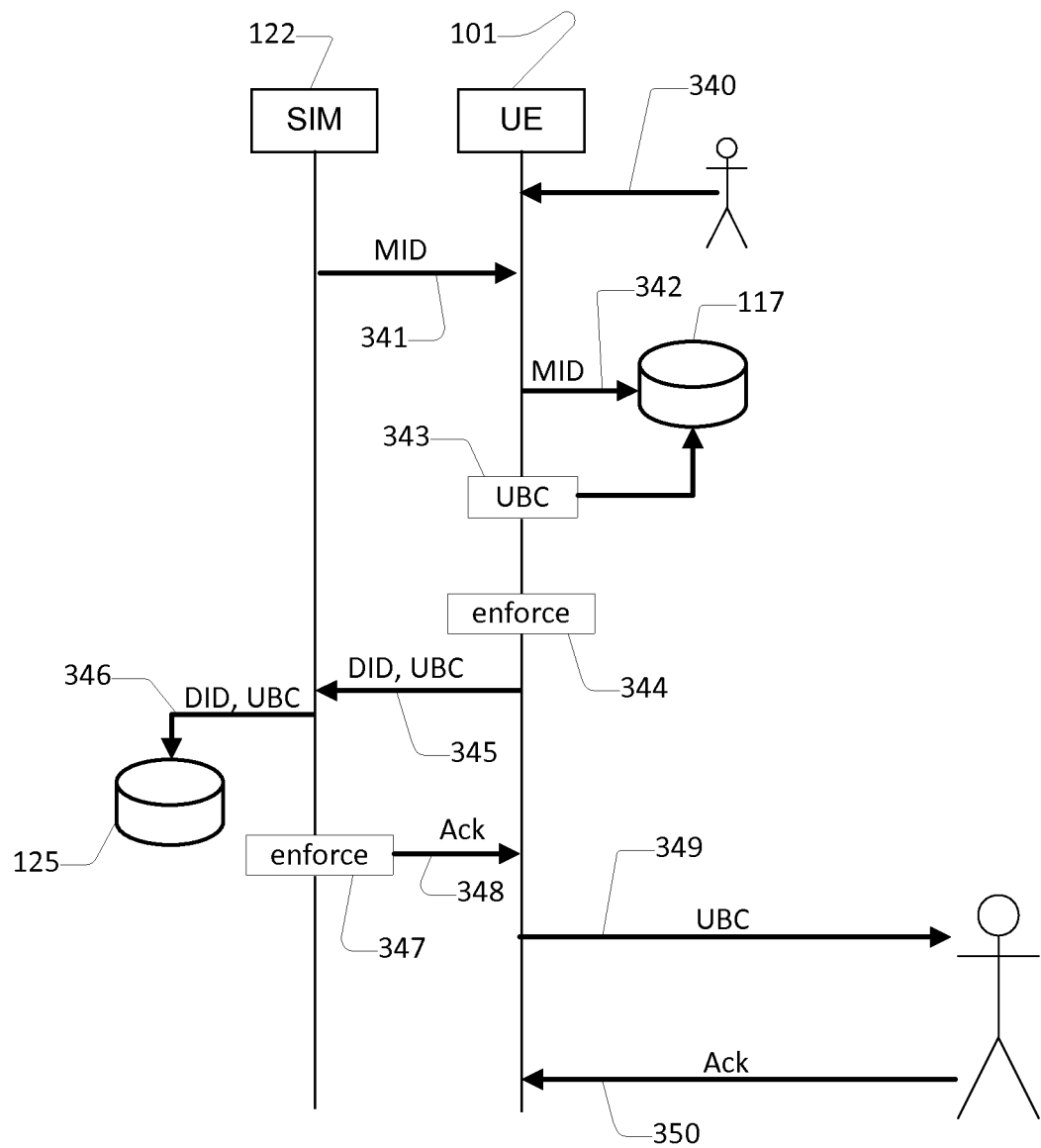
FIGS. 3-5 schematically illustrate examples of a process for binding a wireless communications device and a subscription identification module, where the binding is based on a device identifier and a module identifier.
Figure 4:
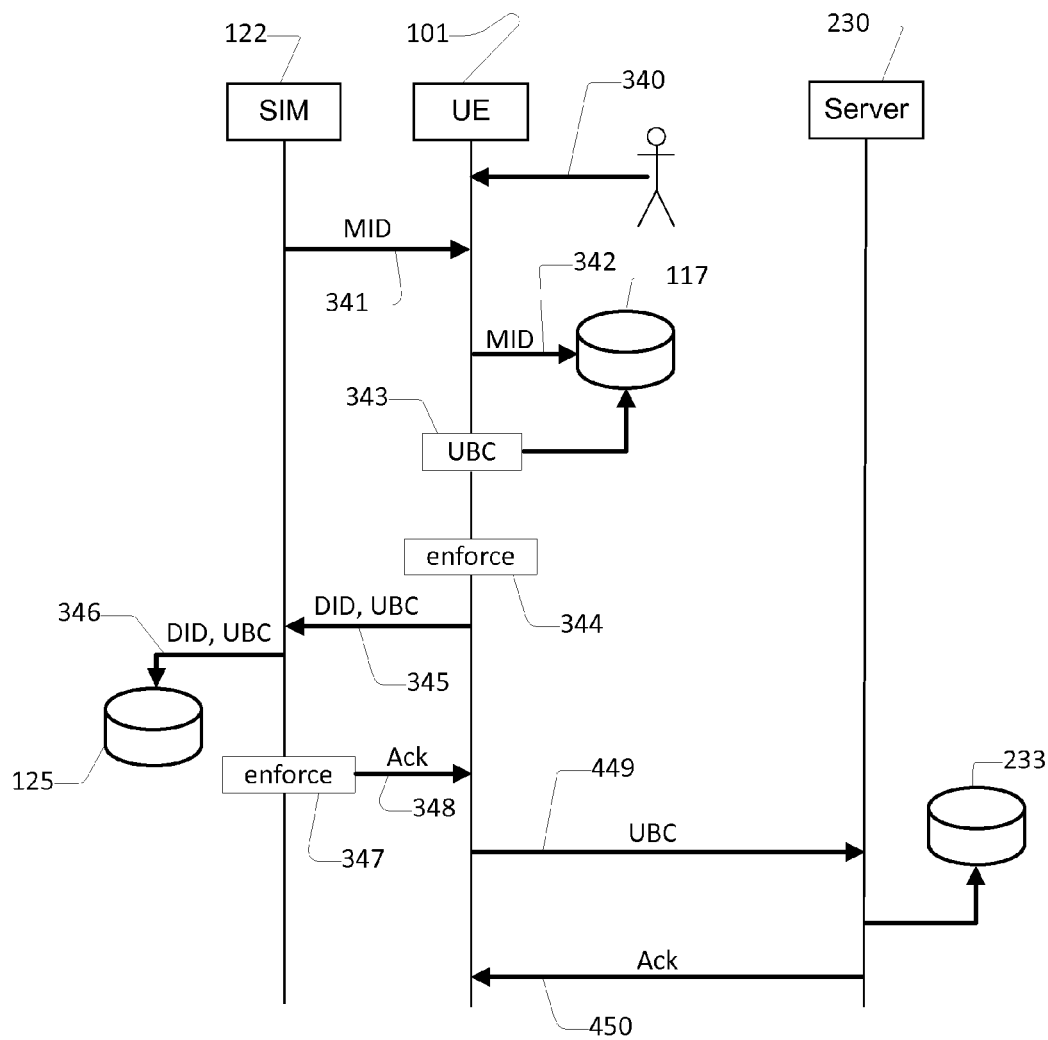
Figure 5:
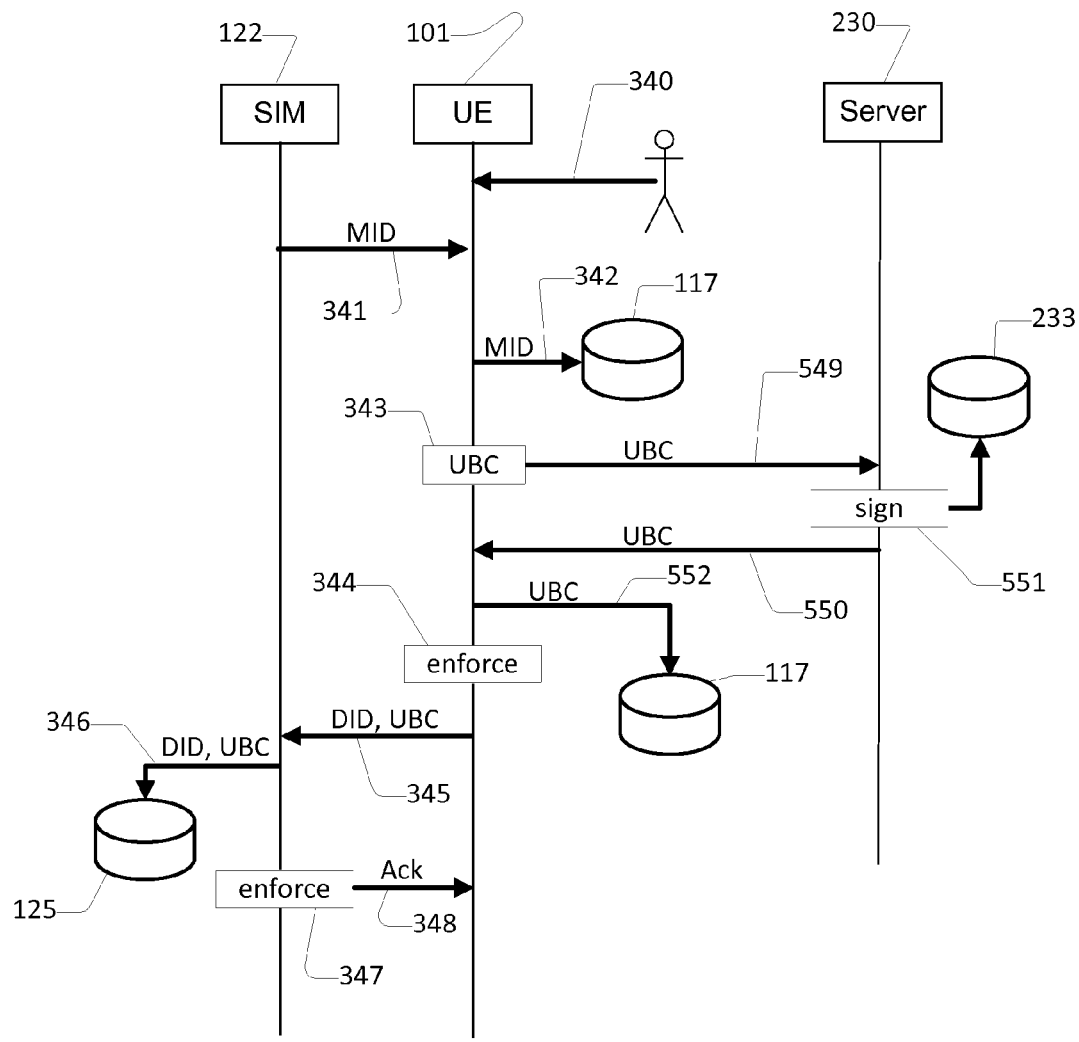

FIGS. 3-5 schematically illustrate respective examples of a process for binding a wireless communications device and a subscription identification module, where the binding is based on a device identifier and a module identifier.

In particular, FIG. 3 schematically illustrates an example of the process for initializing a binding between a user equipment (UE) 101 and a subscription identification module (SIM) 122. In the example of FIG. 3, the binding is based on a device identifier (in the following referred to as DID) identifying the wireless communications device and a module identifier (in the following referred to MID) identifying the subscription identification module. For example, the IMEI of a UE may be used as device identifier and the IMSI may be used as module identifier.

The process is initiated by the user of the UE or by the owner of the subscription that is associated with the SIM. In particular, the process is initiated by the user or subscription owner issuing a binding command 340 to the UE. The binding command may e.g. be entered into the UE via a user-interface such as a keyboard, keypad, touch screen or the like. Alternatively, the binding command 340 may be received via a suitable communications channel, e.g. in the form of a short message service (SMS), or the like.

Responsive to the binding command 340, the UE selects the SIM applications on the component that holds one or more SIM applications and reads the MID (341) and stores (342) it in the memory 117 of the UE.

In subsequent step 343, the UE generates an associated unbind code (in the following also referred to as UBC), and stores it in the memory 117.

In subsequent step 344, the UE starts to enforce the binding to the SIM. The binding can be realized by making certain critical UE functions (e.g. reading user/application data from memory, communications services, executing application programs, etc.) depend in the condition that the correct SIM (with the specific MID) is present. Alternatively, this step may take place later when the UE has verified that all information needed has been received and stored correctly. The UE may also request a user confirmation before the UE starts enforcing the binding.

Subsequently, the UE sends its DID and the unbind code to the SIM in a binding command 345. It is worthwhile noting that subscription identification modules normally operate as slave devices. Consequently, all communication with the SIM is initiated by the UE. The SIM stores (346) the DID and the unbind code in its memory.

The SIM responds with a success indication 348, optionally including the associated unbind code. It will be appreciate that in embodiments where the SIM generates its own unbind code (different from the unbind code generated by the UE), the process may comprise additional steps to ensure that the UE has received the unbind code.

In step 347, the SIM locks on the DID of the UE, i.e. starts enforcing the binding. Again, this step may take place later when checks have taken place that all required information has been received and stored correctly. It may also start to be enforced by asking the user if the binding should be implemented or not. The latter procedure may require an execute command sent by the UE to the SIM.

The UE displays (349) the unbind code or makes it otherwise accessible to the user. The user may then enter a confirmation 350 that the unbind code has been received and the binding may be enforced.

FIG. 4 schematically illustrates another example of the process for initializing a binding between user equipment (UE) 101 and a subscription identification module (SIM) 122. The example of FIG. 4 is similar to the example of FIG. 3 in that the binding is based on a device identifier (in the following referred to as DID) that identifies the wireless communications device and on a module identifier (in the following referred to MID) that identifies the subscription identification module. For example, the IMEI of a UE may be used as device identifier and the IMSI may be used as module identifier. The example of FIG. 4 differs from the example of FIG. 3 in that the generated unbind code(s) is/are sent to and recorded by a remote data processing system 230. For example the unbind code(s) may be sent via a cellular telecommunications network Over-The-Air (OTA) to a remote server.

As in the previous example, the process is initiated by the user or subscription owner issuing a binding command 340 to the UE. The binding command may e.g. be entered into the UE via a user-interface or received via a suitable communications channel. Responsive to the binding command 340, the UE selects the SIM applications on the component that holds one or more SIM applications and reads the MID (341) and stores (342) it in the memory 117 of the UE. In subsequent step 343, the UE generates an associated unbind code and stores it in the memory 117. In subsequent step 344, the UE starts to enforce the binding to the SIM. Alternatively, this step may take place later when the UE has verified that all information needed has been received and stored correctly. The UE may also request a user confirmation before the UE starts enforcing the binding.

Subsequently, the UE sends a binding command 345 including its DID and the unbind code to the SIM. The SIM stores (346) the DID and the unbind code in its memory 125.

The SIM responds with a success indication 348, optionally including the associated unbind code. It will be appreciate that in embodiments where the SIM generates its own unbind code (different from the unbind code generated by the UE), the process may comprise additional steps to ensure that the UE has received the unbind code.

In step 347, the SIM locks on the DID of the UE, i.e. starts enforcing the binding. Again, this step may take place later when checks have taken place that all required information has been received and stored correctly. It may also start to be enforced by asking the user if the binding should be implemented or not. The latter procedure may require an execute command sent by the UE to the SIM.

The UE sends (449) the unbind code to the data processing system 230. In embodiments where the SIM generates a separate unbind code, the SIM unbind code may be sent to the data processing system without being accessible to the UE, e.g. by encrypting the unbind code using a shared secret between the SIM and the data processing system, or using a public key associated with the remote data processing.

The remote data processing system 230 stores the received unbind code in a data storage device 233 and acknowledges (450) receipt of the unbind code. In some endowments, the binding is not implemented until the UE has verified that the unbind code has been correctly received and stored by the data processing system. To this end, the data processing system 230 may use the possibility of having a cryptographic Message Authentication Code (MAC) protection of the data sent.

FIG. 5 schematically illustrates another example of the process for initializing a binding between user equipment (UE) 101 and a subscription identification module (SIM) 122. The example of FIG. 5 is similar to the example of FIG. 4, but differs from the example of FIG. 4 in that the generated unbind code is cryptographically signed by the remote data processing system 230.

In particular, after the UE has generated the unbind code in step 343, the UE sends (549) the unbind code to the remote data processing system 230 which then cryptographically signs (551) the unbind code (and optionally additional data indicative of the status of the binding), stores the unbind code in the data storage 233, and sends (550) the signed unbind code (and optionally the additional data) back to the UE for storage (552) in its memory 117. Then the UE can use a public key in the firmware to check during startup the correctness of the bind data and the status of the binding.

As part of such an embodiment the firmware of the UE may limit UE functionality, if data related to the bind data is completely removed. In this way one enforces that such signed bind data always must be present. Both the remote data processing system and the UE manufacturer may create valid bind data signatures.

Figure 6:
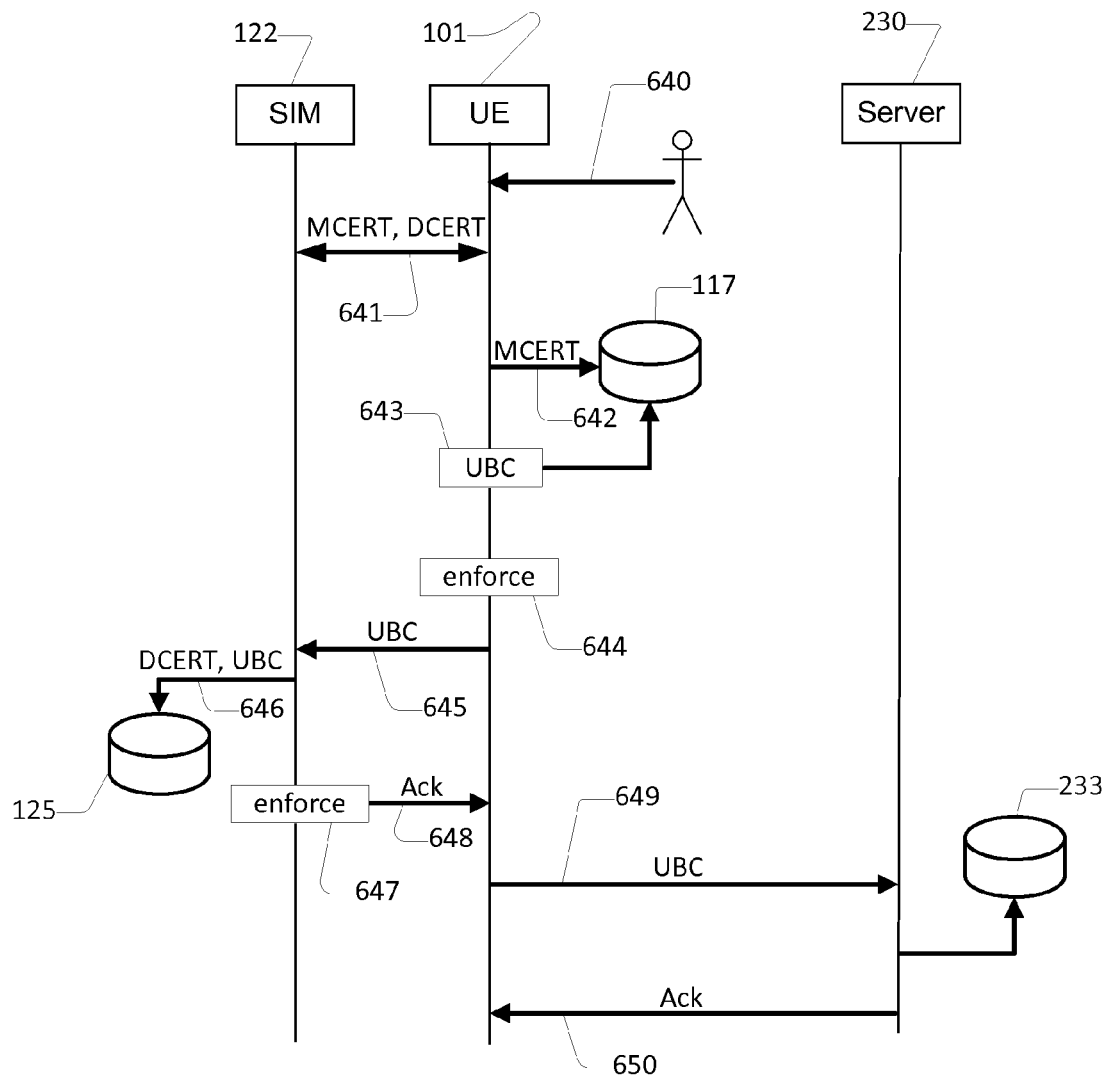
FIG. 6 schematically illustrates an example of a process for binding a wireless communications device and a subscription identification module where the binding is based on a secure channel.

FIG. 6 schematically illustrates an example of a process for binding a wireless communications device and a subscription identification module where the binding is based on a secure channel.

As in the previous examples, the process is initiated by the UE receiving a binding command 640 from a user of the UE or from the subscription owner.

Subsequently, the UE initiates establishment (641) of a secure channel between the UE and the SIM (or another component that holds one or more SIM applications). The channel is established using certificates held by the UE and the SIM, respectively. In the following, the certificate held by the UE will also be referred to as device certificate (DCERT), while the certificate held by the SIM will also be referred to as module certificate (MCERT). These certificates may be self-signed certificates, resulting in a particular convenient implementation. The identities in the UE and SIM certificates may be the IMEI and the IMSI respectively (or similar device and module identifiers). In alternative embodiments, the Generic Bootstrapping Architecture (GBA) may be used to setup a secure channel.

The UE stores (642) the module certificate in its memory 117 and generates (step 643) an associated unbind code (UBC) which is also stored in the memory 117.

In subsequent step 644, the UE starts to enforce the binding to the SIM as described above. Alternatively, this step may take place later when the UE has verified that all information needed has been received and stored correctly. The UE may also request a user confirmation before the UE starts enforcing the binding The UE sends a command (645) to the SIM causing the SIM to bind to the secure channel, i.e. to the device certificate of the UE. The command includes the unbind code. At this point, the device certificate is already available in the SIM as it has been used to set up the secure channel. The SIM stores (646) the device certificate and the unbind code in its memory 125.

In step 647, the SIM locks on the device certificate of the UE, i.e. starts enforcing the binding. Again, this step may take place later when checks have taken place that all required information has been received and stored correctly. It may also start to be enforced by asking the user if the binding should be implemented or not. The latter procedure may require an execute command sent by the UE to the SIM. The SIM sends an acknowledgement 648 to the UE.

The UE sends (649) the unbind code to a remote server where it is stored in a data storage device 233, and the data processing server 230 responds with an acknowledgement message 650, all as described in connection with FIG. 4 or 5. Alternatively or additionally, the UE may display the unbind code as described in connection with FIG. 3.

Figure 7:
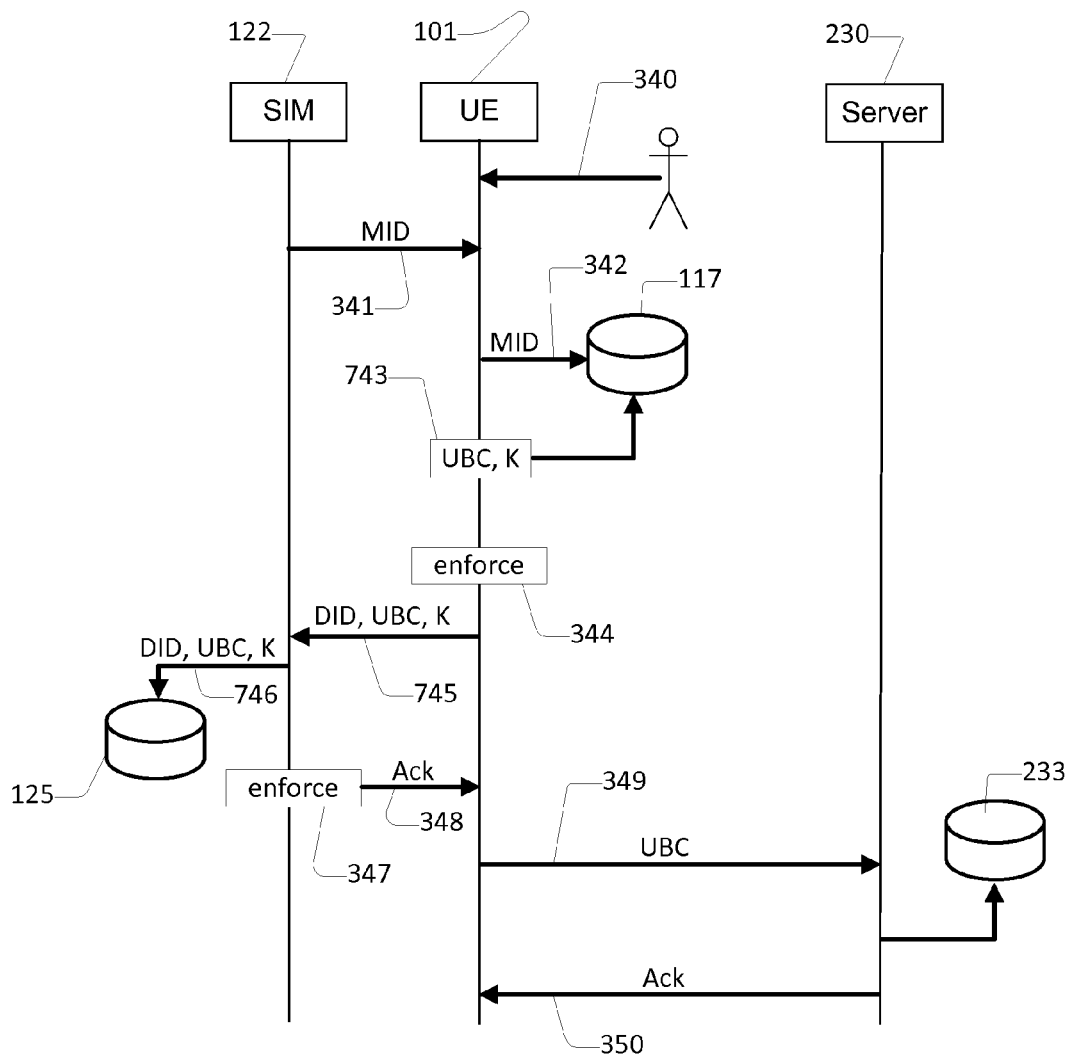
FIG. 7 schematically illustrates an example of a process for binding a wireless communications device and a subscription identification module where the binding is further based on a challenge response mechanism.

FIG. 7 schematically illustrates an example of a process for binding a wireless communications device and a subscription identification module where the binding is further based on a challenge-response mechanism.

As in the previous examples, the process is initiated by the UE receiving a binding command 340 from a user of the UE or from the subscription owner owning the subscription associated with the SIM. Responsive to the binding command 340, the UE selects the SIM applications on the component that holds one or more SIM applications and reads the MID (341) and stores (342) it in the memory 117 of the UE.

In step 743, the UE generates an associated security key (K) and an unbind code (UBC), and the E stores the generated unbind code and key in its memory 117.

In subsequent step 344, the UE starts to enforce the binding to the SIM, as described in connection with the previous examples.

The UE sends (745) a binding command 745 to the SIM. The binding command comprises the device identifier (DID)

of the UE (e.g. its NEI), the security key (K) and the unbind code (UBC). The SIM stores (746) the receive device identifier, key, and unbind code.

The SIM responds with a success indication 348, optionally including the associated unbind code and security key K; and the SIM starts enforcing (347) the binding, all as described in connection with the previous examples. The UE displays the unbind code or sends it to the remote data processing system 230 for storage, likewise as described in connections with the previous embodiments. In some embodiments, the UE also sends the security key K to the remote data processing system 230 so as to allow binding another UE to the same SIM or another SIM to the UE.

Figure 8:
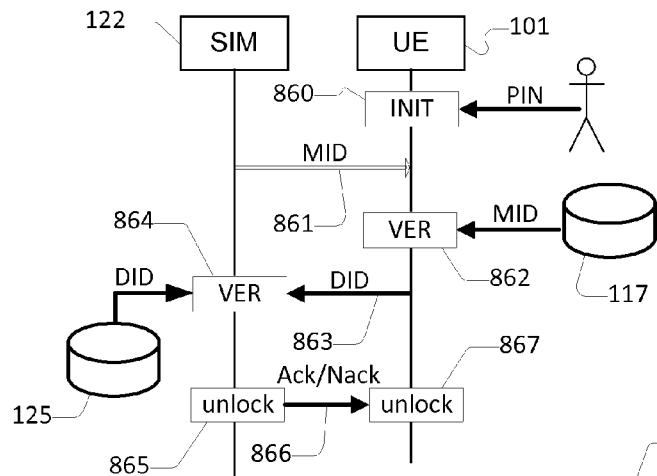
FIGS. 8-10 schematically illustrate examples of a process of enforcing a binding between a wireless communications device and a subscription identification module.
Figure 9:
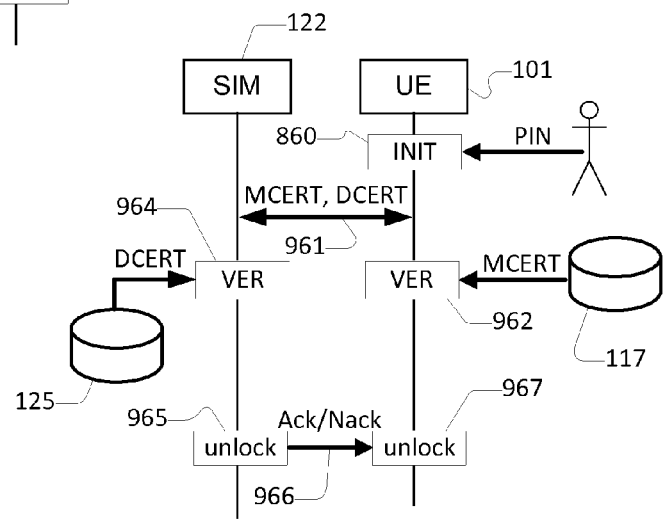
Figure 10:
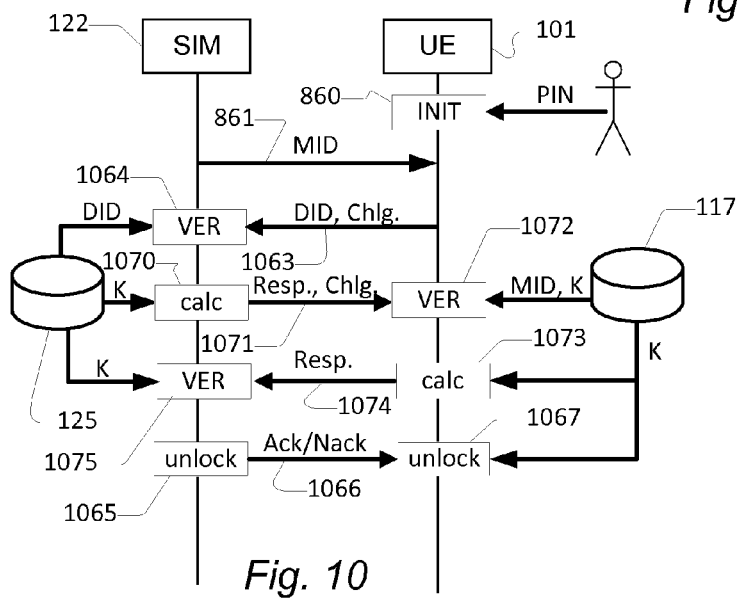

FIGS. 8-10 schematically illustrate examples of a process of enforcing a binding between a wireless communications device and a subscription identification module.

In particular, FIG. 8 illustrates an example of a power-up process of a UE 101 where the binding between the UE and the SIM 122 is based on a device identifier (e.g. the IMEI) and a module identifier (e.g. the IMSI), e.g. as described in connection with one of FIGS. 3-5.

In initial step 860, the user powers the UE on, causing the UE to recognize that UE-SIM binding is required, e.g. by detecting a stored unbind code, a status flag, a signed binding status, and/or the like. This initial step may further include the user unlocking the display of the UE. As binding is used, only a subset of all available commands are made available to the user at this point. The commands that are unlocked (i.e. available) may be the ones needed to unlock the SIM, enter a PUK and commands for handling the binding. If required, during this initial step, the user may further unlock the SIM by entering the PIN code.

The UE then reads (861) the module identifier (MID) from the SIM.

In step 862, and based on data stored in its memory 117, the UE verifies that the MID is the one recorded when the binding was established.

The UE sends a command (863) to the SIM causing the SIM to verify the UE. The command comprises the device identifier (DID).

In step 864, based on an internally stored state variable in its memory 125, the SIM checks that SIM to UE binding is used, and verifies that the received device identifier (DID) equals the one recorded in the SIM memory 125 when the binding was established. Upon successful verification, the SIM enables its full service in step 865, and returns an acknowledgment message 866 to the UE. If not, a failure indication is sent back showing that the SIM is bound to another UE, and the SIM keeps full service disabled.

Finally, in step 867, the UE unlocks all commands/functions in the UE.

FIG. 9 illustrates an example of a power-up process of a UE 101 with where the binding between the UE and the SIM 122 is based on a secure channel between the UE and the SIM, e.g. as described in connection with FIG. 6. In initial step 860, the user powers the UE on, causing the UE to recognize that UE-SIM binding is required, e.g. as described in connection with FIG. 8.

The UE then initiates setup of a secure channel 961 between the UE and the SIM.

In step 962, the UE verifies that the module certificate (MCERT) is the one that was recorded in the UE memory 117 when the binding was established. Similarly, in step 964, the SIM checks that SIM to UE binding is used and verifies that the device certificate (DCERT) equals the one recorded in the SIM memory 125 when the binding was established. If not, a failure indication is sent back showing that the SIM is bound to another UE.

Upon successful verifications, the secure channel is established, and the SIM and the UE functionalities are unlocked (steps 965 and 976, respectively). During these steps, the device and module identifiers DID and MID, respectively (e.g. the IMEI and IMSI), may be exchanged, and a success indication 966 is sent from the SIM to the UE.

FIG. 10 illustrates an example of a power-up process of a UE 101 with where the binding between the UE and the SIM 122 is based on a challenge response process between the UE and the SIM, e.g. as described in connection with FIG. 7.

The process is initiated in step 860 as described in connection with FIG. 8, followed by the UE reading (861) the module identifier (MID) from the SIM.

The UE then sends a "verify bind" command 1063 to the SIM. The command includes the device identifier (DID) of the UE and a challenge, e.g. a random number or a value out of a non-repeating sequence of values (such as a monotonically increasing counter).

In step 1064, the SIM verifies that the received device identifier (DID) equals the one recorded in the SIM memory 125 when the binding was established. If not, a failure indication is sent back showing that the SIM is bound to another UE and the SIM keeps full service disabled.

In step 1070, the SIM calculates a response from the challenge, the security key K that was recorded when the binding was established, and possibly from other parameters like the device identifier (using the value stored when the binding was established) and the module identifier (MID). The SIM sends the calculated response 1071 back to the UE. The response also comprises a challenge to the UE. This challenge may e.g. be the SIM response, a random number or a value out of a non-repeating sequence of values.

In step 1072, the UE verifies the response 1071 by calculating the expected response using the issued challenge, the security key and possibly other parameters like the module identifier (using the value stored when the binding was established) and the device identifier, and by comparing the calculated response with the received response 1071.

In step 1073, the UE calculates a response to the challenge received from the SIM and sends the calculated response 1074 back to the SIM. The calculations are corresponding to the ones done for the ME (Mobile Equipment) challenge.

In step 1075, the SIM verifies the response by calculating the expected response using the issued challenge, the security key and possibly other parameters as described above, and by comparing the calculated with the received response. If the comparison is OK then the SIM enables full service operation (step 1065) and acknowledges successful unlocking (1066); if not, a failure indication is sent back showing that the SIM is bound to another UE and the SIM keeps full service disabled.

Similarly, in step 1067, the UE unlocks all commands/functions in the UE.

Figure 11:
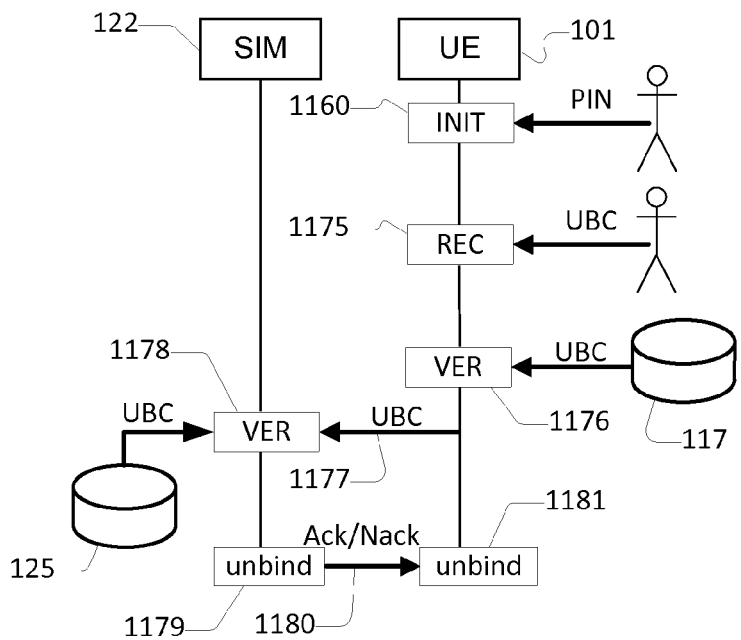
FIGS. 11-12 schematically illustrate examples of a process for unbinding a wireless communications device and a subscription identification module.
Figure 12:
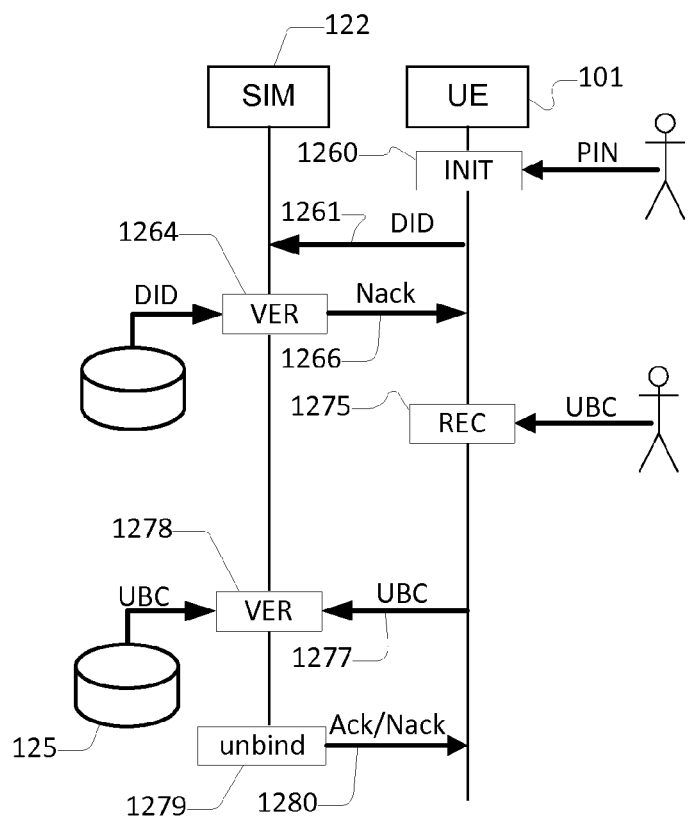

FIGS. 11-12 schematically illustrate examples of a process for unbinding a wireless communications device and a subscription identification module.

In particular, FIG. 11 illustrates and example of a process for unbinding the UE from a SIM, and unbinding the SIM from the UE.

In initial step 1160, the user powers on the UE, and the UE recognizes that UE to SIM binding is required. This step is similar to the step 860 of FIGS. 8-10. As part of the initial step, the user may need to unlock the display. As binding is used, only a subset of all available commands are made available at this point. The commands that are unlocked are typically the ones needed to enter a PIN for the SIM, enter a PUK, and commands for handling the binding. The user may need to enter a PIN for the SIM.

In step 1175, the user or subscription owner initiates unbinding between the UE and the SIM by entering/sending an unbind command to the UE, causing the UE to respond by requesting the unbind code (UBC). The user then enters the unbind code. In some embodiments, if the unbind code was recorded by a remote data processing system, the user may need to obtain the unbind code from said remote data processing system.

Upon receipt of the unbind code, the UE checks the unbind code (step 1176) by comparing the received unbind code with the unbind code stored in memory 117 during establishment of the binding. If the check is successful, the UE deactivates the UE to SIM binding. This may be done at this stage of the process or, as illustrated in the example of FIG. 11 by step 1181, upon receipt of a unbind confirmation from the SIM.

Subsequently, the UE sends an unbind command (1177) including the unbind code to the SIM.

In step 1178, the SIM compares the received unbind code with the unbind code that was stored in the SIM memory 125 during establishment of the binding. The SIM responds with status code (success/failure) 1177 and deactivates the binding to the UE (step 1179), if the check of the unbind code was a success. Finally, the UE may inform the user and/or a remote data processing system of the result (success/failure) of the unbinding process.

In the above example, it was assumed that the SIM to which the UE was bound is operationally connected to the UE during the unbind process. It will be appreciated however, that the binding of the UE to a SIM may also be removed if the SIM to which the UE is bound is not present, i.e. when the UE is operated with a different SIM.

In such a situation, the initial steps of the unbind process may be the same as in the above example, i.e. the process starts with the initial power-up step 1160. During this step, the UE will detect that the SIM to which it is bound is not present (e.g. by performing one of the processes of FIG. 8-10). Responsive to the failure to detect the SIM to which the UE is bound, the UE may prompt the user whether he wishes to unbind the UE and to enter the unbind code. The process then continues at step 1175 of FIG. 11 where the UE receives the unbind code and, in subsequent step 1176, verifies the unbind code as described above.

Upon successful verification, the UE unlocks the deactivated functionality (step 1181). In this scenario no communication of the unbind code to the SIM and no verification of the unbind code by the SIM are required, as the SIM operationally connected to the UE is not bound to the UE.

The above procedure may even work if the SIM is bound to another UE. It is understood, however, that operation of the UE with such a SIM would additionally require unbinding of the SIM from the other UE, e.g. by the process described in connection with FIG. 12 below. This in turn implies that the above signaling may be performed over an unprotected channel, e.g. even if the binding was established based on a secure channel.

FIG. 12 illustrates and example of a process for unbinding a SIM from a UE, if the SIM is operationally connected to another UE during the unbinding process.

In initial step 1260, the user powers on the UE (with the SIM to be unlocked inserted in or otherwise operationally connected to the UE). As part of the initial step, the user may need to unlock the display and/or enter a PIN for the SIM.

In step 1261, the UE sends (1261) its device identifier to the SIM, and the SIM attempts verification of the device identifier (step 1264), e.g. as described with reference to steps 961 and 964 of the process of FIG. 9. However, since the SIM in this scenario is bound to a different UE, the verification fails, and the SIM responds with a failure message 1266.

In step 1275, the UE then informs the user about the failure and asks whether the user wants to unbind the SIM. The user responds YES and inputs the unbind code. If the unbind code has been stored in a remote data processing system, the user may have to obtain the unbind code from said remote data processing system.

Upon receipt of the unbind code, the UE sends an unbind command 1277 to the SIM together with the received unbind code.

In step 1278, the SIM checks the received unbind code by comparing it with the unbind code that was stored in the SIM memory 125 during establishment of the binding. In step 1279, if the check was successful, the SIM terminates the binding to a specific UE and allows its use by any UE. In any event, the SIM returns a message 1280 to the UE informing the UE about the result of the unbind attempt (success/failure). The UE may report the result of the operation to the user and start to use the SIM, if the unbinding was successful.

In the above example, it was assumed that the UE used for the unbinding was not bound to any SIM. Furthermore, during the unbind operation described above, the UE was controlled locally by the user.

Hence, the above description has described examples of methods, devices and system providing an on-the-fly establishment of a binding between a wireless communications device and a subscription identification module with unlocking/unbind codes. Embodiments of the methods, devices and systems described herein further provide a startup procedure when binding is in place, where the communications device and/or the subscription identification module will not start full service if the binding is not successfully verified, as well as a support node for safe storage of unbind codes.

The binding of the communications device to a subscription identification module described herein causes the communications device to have little if any value to an unauthorized user when the subscription associated to the subscription identification module is barred. What type of functions of the communications device and/or the subscription identification module should be unavailable in case of an unsuccessful binding verification may be predefined or it could be defined by the user during the binding process. For example, the user may specify which functions are blocked in addition to a mandatory set of blocked functions in case the binding verification is unsuccessful.

An example of a set of mandatory blocked functions of a communications device may include access to private data, full audio and screen usage, full communication/radio capability. An example of a mandatory set of blocked functions of a subscription identification module may include execution of an authentication and key agreement (AKA) procedure and/or storage of previously derived security contexts.

The binding of the subscription identification module to a given communications device gives the user/subscription owner assurance that data sent/received with a given subscription identification module will be handled/sent/received by a specific communications device (e.g. by equipment that has been approved by the owner).

Embodiments of the methods, devices and systems described herein thus provide protection of the communications device against a non-authorized use by combining the protection capabilities of the communications device and the subscription identification module. Compared to known SIM-Lock mechanisms, the combined binding is stronger because the SIM lock state and the SIM-lock unlock conditions are entirely stored in the ME and must be protected against attacks by the ME user.

Compared to existing phone-lock or screen lock functions, embodiments of the method, device and system described herein may be implemented based on existing security functions, and the network can assist in unlocking by the rightful owner.

Although some embodiments have been described and shown in detail, the aspects disclosed herein are not restricted to them, but may also be embodied in other ways within the scope of the subject matter defined in the following claims. In particular, it is to be understood that other embodiments may be utilized and structural and functional modifications may be made. In particular, embodiments of the aspects disclosed herein have mainly been described with reference to mobile phones and similar user equipment. It will be understood, however, that embodiments of the methods, devices and systems may also be applied to other types of wireless communications devices, such as Machine Type Communication (MTC) device, or machine-to-machine (M2M) communications devices.

Furthermore, even though the method, devices and systems described herein have mainly been described with reference to mobile telecommunication, it will be appreciated that embodiments of the methods, systems, and devices disclosed herein may also be implemented in the context of other communications technologies, such as wireless local area networks (WLAN), Bluetooth, etc. and/or to combinations of different communications technologies.

Likewise, even though the examples described above mainly relate to embodiments in which a single UE was bound to a given SIM, it will be appreciated that binding of several UE's (for example the UE's of a set of company-approved phones) may also be provided. The binding may e.g. be made on the basis of a list of IMEIs or other device identifier or similar secure attribute in the UE that can be read out.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

Finally, the present disclosure uses the following abbreviations:
3GPP 3rd Generation Partnership Project
AKA Authentication and Key Agreement
CPU Central Processing Unit
DCERT Device CERTificate
DID Device IDentifier
EDGE Enhanced Data for GSM Evolution
ETSI European Telecommunications Standards Institute
eUICC embedded Universal Integrated Circuit Card
GBA Generic Bootstrapping Architecture
GSM Global System for Mobile communication
ICC Integrated Circuit Card
IMEI International Mobile Equipment Identifier
IMSI International Mobile Subscriber Identity
K Key
M2M Machine-to-Machine
MAC Message Authentication Code
MCERT Module digital CERTificate
ME Mobile Equipment
MID Module IDentifier
MTC Machine Type Communication
OTA Over-The-Air
PC Personal Computer
PIN Person Identification Number
PUK Personal Unblocking Key
RAM Random Access Memory
SIM Subscriber Identity Module
SMS Short Message Service
TS Technical Specification
UBC UnBind Code
UE User Equipment
UMTS Universal Mobile Telecommunications System
USB Universal Serial Bus
WLAN Wireless Local Area Networks

The invention claimed is:

1. A method for protecting a wireless communications device against unauthorized use of functionality provided by the wireless communications device, the method comprising:
receiving a binding command to bind the wireless communications device to a subscription identification module operationally coupled to the wireless communications device and associated with a subscription to a communications service;
responsive to the received binding command, storing:
a module identifier (MID) identifying the subscription identification module; and
a device identifier (DID) identifying the wireless communications device;
obtaining an unbind code (UBC) and storing the obtained unbind code;
performing a module verification verifying that a subscription identification module identified by a stored module identifier is operationally coupled to the wireless communications device;
performing a device verification verifying whether a wireless communications device identified by a stored device identifier is operationally coupled to the subscription identification module; and
preventing operation of at least a part of the functionality unless the module verification and the device verification have been performed successfully;
wherein the module verification comprises:
setting up a secure communications channel between the wireless communications device and the subscription identification module, using a module digital certificate of the subscription identification module and a device digital certificate of the wireless communications device; and
verifying the module digital certificate.

2. The method of claim 1:
wherein storing the module identifier comprises receiving the module identifier from the subscription identification module and storing the received module identifier; and wherein storing the device identifier comprises receiving the device identifier from the wireless communications device and storing the received device identifier.

3. The method of claim 1, wherein obtaining the unbind code comprises generating the unbind code by the wireless communications device.

4. The method of claim 1, wherein storing the unbind code comprises sending the unbind code to a remote server for storage.

5. The method of claim 1, further comprising the wireless communications device communicating the unbind code to the subscription identification module.

6. The method of claim 1:
wherein the module identifier is a digital certificate of the subscription identification module; and
wherein the device identifier is a digital certificate of the wireless communications device.

7. The method of claim 1, further comprising:
the wireless communications device creating a security key;
sending the created key to the subscription identification module; and
storing the security key by the wireless communications device and by the subscription identification module.

8. The method of claim 7, wherein the module verification comprises:
sending a challenge data item by the wireless communications device to the subscription identification module;
receiving a response data item from the subscription identification module; and
comparing the received response data item with a data item calculated from the challenge data item and the security key.

9. The method of claim 1:
wherein the module verification comprises receiving a second identifier identifying the subscription identification module from the subscription identification module, and comparing the received second identifier with the stored MID; and
wherein the device verification comprises receiving a third identifier identifying the wireless communications device by the subscription identification module, and comparing the received third identifier with the stored DID.

10. The method of claim 1,
wherein the device verification comprises verifying the device digital certificate.

11. The method of claim 1, further comprising:
the wireless communications device receiving an unbind command and an unbind code; and
responsive to the unbind command:
comparing the received unbind code to the stored unbind code; and
deactivating binding of the wireless communications device to the subscription identification module.

12. The method of claim 1, wherein the method comprises:
the wireless communications device receiving the binding command;
responsive to the received command:
storing the module identifier by the wireless communications device; and
storing the device identifier by the subscription identification module;
obtaining the unbind code and storing the obtained unbind code by the wireless communications device and by the subscription identification module;
performing the module verification by the wireless communications device;
performing the device verification by the subscription identification module; and
preventing operation of at least a part of the functionality unless the module verification and the device verification have been performed successfully.

13. A wireless communications device, comprising:
a processing circuit;
memory;
an interface for receiving commands;
a module interface for communicating data with a subscription identification module operationally coupled to the wireless communications device and associated with a subscription to a communications service;
wherein the memory has stored thereon instructions that, when executed by the processing circuit, cause the processing circuit to:
store, responsive to a binding command received by the wireless communications device via the interface, a module identifier on a storage device, the module identifier identifying the subscription identification module;
send a device identifier identifying the wireless communications device to the subscription identification module via the module interface and to cause the subscription identification module to store the device identifier;
store an unbind code in the memory;
send the unbind code to the subscription identification module via the module interface and to cause the subscription identification module to store the unbind code;
perform a module verification by:
setting up a secure communications channel between the wireless communications device and the subscription identification module, using a module digital certificate of the subscription identification module and a device digital certificate of the wireless communications device; and
verifying the module digital certificate,
the module verification verifying that a subscription identification module identified by a stored module identifier is operationally coupled to the wireless communications device;
cause the subscription identification module to perform a device verification, the device verification verifying whether the wireless communications device identified by the stored device identifier is operationally coupled to the subscription identification module;
prevent operation of at least a part of the functionality unless the module verification and the device verification have been performed successfully.

14. A subscription identification module associated with a subscription to a communications service, the subscription identification module comprising:
a processing circuit;
memory;
a device interface for communicating data with a wireless communications device operationally coupled to the subscription identification module;

wherein the memory has stored thereon instructions that, when executed by the processing circuit, cause the processing circuit to:
  receive, via the device interface, a data item identifying the wireless communications device, and store the data item in the memory;
  receive an unbind code via the device interface and store the unbind code in the memory;
  perform a module verification by:
    setting up a secure communications channel between the wireless communications device and the subscription identification module, using a module digital certificate of the subscription identification module and a device digital certificate of the wireless communications device; and
    verifying the module digital certificate,
  the module verification verifying whether a wireless communications device identified by a stored data item is operationally coupled to the subscription identification module; and
  prevent operation of selected functionality of the subscription identification module unless the verification has been performed successfully.

15. A data processing system, comprising:
a processing circuit;
a memory;
an interface for communicating data with a wireless communications device;
wherein the memory has stored thereon instructions that, when executed by the processing circuit, cause the data processing system to:
  receive, via the interface, a data item indicative of at least an unbind code for authorizing deactivation of a binding between the wireless communications device and a subscription identification module operationally coupled to the wireless communications device, wherein the subscription identification module is operationally coupled to the wireless communication device based on a module verification, the module verification comprises:
    setting up a secure communications channel between the wireless communications device and the subscription identification module, using a module digital certificate of the subscription identification module and a device digital certificate of the wireless communications device; and
    verifying the module digital certificate;
  digitally sign the received data item; and
  send, via the interface, the digitally signed data item to the wireless communications device.

* * * * *